US011030589B2

(12) United States Patent
Purves

(10) Patent No.: US 11,030,589 B2
(45) Date of Patent: *Jun. 8, 2021

(54) HOSTED DISBURSEMENT SYSTEM

(71) Applicant: Visa International Service Association, San Francisco, CA (US)

(72) Inventor: Thomas Purves, San Francisco, CA (US)

(73) Assignee: Visa International Service Association, San Francisco, CA (US)

(*) Notice: Subject to any disclaimer, the term of this patent is extended or adjusted under 35 U.S.C. 154(b) by 88 days.

This patent is subject to a terminal disclaimer.

(21) Appl. No.: 16/404,207

(22) Filed: May 6, 2019

(65) Prior Publication Data

US 2019/0259009 A1    Aug. 22, 2019

Related U.S. Application Data

(63) Continuation of application No. 14/053,459, filed on Oct. 14, 2013, now Pat. No. 10,318,935.

(60) Provisional application No. 61/713,353, filed on Oct. 12, 2012.

(51) Int. Cl.
| | | |
|---|---|---|
| *G06Q 20/10* | (2012.01) | |
| *G06Q 20/04* | (2012.01) | |
| *G06Q 30/06* | (2012.01) | |
| *G06Q 40/02* | (2012.01) | |

(52) U.S. Cl.
CPC ............. *G06Q 20/10* (2013.01); *G06Q 20/04* (2013.01); *G06Q 30/06* (2013.01); *G06Q 40/02* (2013.01)

(58) Field of Classification Search
CPC ........ G06Q 20/04; G06Q 20/02; G06Q 20/10; G06Q 40/02; G06Q 30/06

USPC .......................................................... 705/39
See application file for complete search history.

(56) References Cited

U.S. PATENT DOCUMENTS

| | | | | |
|---|---|---|---|---|
| 5,222,018 A | * | 6/1993 | Sharpe | G06Q 20/102 705/30 |
| 7,006,983 B1 | * | 2/2006 | Packes, Jr. | G06Q 30/02 705/14.34 |
| 8,352,361 B2 | * | 1/2013 | Volchek | G06Q 20/042 705/39 |
| 8,732,078 B1 | * | 5/2014 | Billman | B65D 47/0842 705/40 |

(Continued)

*Primary Examiner* — Lindsay M Maguire
*Assistant Examiner* — Michael J Warden
(74) *Attorney, Agent, or Firm* — Kilpatrick Townsend & Stockton LLP

(57) ABSTRACT

Systems and methods are disclosed for making disbursements to one or more consumers via a hosted disbursement system. In accordance with an embodiment, a method can comprise receiving, at a merchant service provider, a request to make a disbursement to a consumer from a merchant. The request can be received from a merchant server and include disbursement information corresponding to the disbursement. The method can further comprise receiving, at the merchant service provider, a selection of a distribution option from the user, which corresponds to a type of account to receive the disbursement. The method can further comprise receiving, at the merchant service provider, account information from the consumer. The account information is sent to the merchant service provider from a user device, bypassing the merchant server. The method can further comprise processing the disbursement using the account information to transfer funds corresponding to the disbursement to the consumer.

20 Claims, 9 Drawing Sheets

(56) References Cited

U.S. PATENT DOCUMENTS

| | | | | |
|---|---|---|---|---|
| 8,856,026 B2* | 10/2014 | Foodman | G06Q 20/387 | 705/14.34 |
| 2002/0032650 A1* | 3/2002 | Hauser | G06Q 20/102 | 705/40 |
| 2002/0052841 A1* | 5/2002 | Guthrie | G06Q 20/102 | 705/40 |
| 2002/0069118 A1* | 6/2002 | Zylstra | G06Q 30/0617 | 705/26.43 |
| 2003/0009377 A1* | 1/2003 | Asami | G06Q 30/02 | 705/14.11 |
| 2004/0187076 A1* | 9/2004 | Ki | H04L 67/303 | 715/208 |
| 2004/0210481 A1* | 10/2004 | Quinlan | G06Q 30/0235 | 705/14.13 |
| 2004/0251305 A1* | 12/2004 | Klapka | G06Q 30/02 | 235/383 |
| 2007/0276720 A1* | 11/2007 | Lu | G06Q 10/06393 | 705/7.12 |
| 2007/0299735 A1* | 12/2007 | Mangalick | G06Q 30/06 | 705/26.41 |
| 2010/0274678 A1* | 10/2010 | Rolf | G06Q 20/3255 | 705/17 |
| 2011/0161201 A1* | 6/2011 | Stocker | H04L 67/02 | 705/27.1 |
| 2012/0150603 A1* | 6/2012 | Bennett | G06Q 30/0611 | 705/14.23 |
| 2012/0239417 A1* | 9/2012 | Pourfallah | G06Q 30/0601 | 705/2 |
| 2012/0271697 A1* | 10/2012 | Gilman | G06Q 30/06 | 705/14.23 |
| 2013/0013500 A1 | 1/2013 | Purves et al. | | |
| 2013/0018757 A1* | 1/2013 | Anderson | G06Q 20/085 | 705/26.35 |
| 2013/0198080 A1* | 8/2013 | Anderson | G06Q 20/26 | 705/44 |
| 2014/0108236 A1* | 4/2014 | Purves | G06Q 20/108 | 705/39 |
| 2019/0259009 A1* | 8/2019 | Purves | G06Q 20/407 | |

* cited by examiner

HOSTED DISBURSEMENT SYSTEM

CROSS-REFERENCE TO RELATED APPLICATIONS

This application is a continuation of U.S. application Ser. No. 14/053,459 filed on Oct. 14, 2013 which is a non-provisional of and claims priority to U.S. Provisional Patent Application No. 61/713,353, filed on Oct. 12, 2012, which is hereby incorporated by reference in its entirety.

BACKGROUND

Many businesses provide disbursements, such as refunds and rebates, to consumers after certain transactions are performed on that consumer's account. For example, a consumer can receive a refund after a friend signs a contract with the consumer's service provider (e.g., cable TV) or a bank can issue rewards after a certain dollar amount is charged on a credit card. Additionally, when a consumer returns goods that they purchased from the merchant, the consumer may choose to receive a refund, rebate, or other disbursement. Similarly, the consumer may expect a recurring rebate from a business, like an insurance company.

Presently, when businesses provide these disbursements to a consumer, a large amount of processing is required to track the value of the disbursement and issue a check or prepaid debit card, such as shown in FIG. 1. The business 101 is required to then mail the check or card 102 to a consumer 103 each time that a disbursement is issued. Not only does this require additional manpower and processing power to provide a physical payment of the value to the consumer, but additional funding is often required in order to purchase the paper, printers, prepaid cards, envelopes and postage.

The aforementioned process is not only burdensome for the businesses issuing the disbursements, but also for the consumer who is required to conduct a transaction, e.g., go to a bank, to deposit a check and keep track of the check and/or numerous prepaid cards received.

Another problem with existing disbursement systems is that different businesses provide different types of disbursements. For example, one type of business may provide for a prepaid card as a disbursement, another business may provide a check as a disbursement, while another may provide a coupon as a disbursement. In this case, a consumer may receive a number of different disbursements in different forms, and this is inconvenient for the consumer.

Accordingly, a system is needed which can streamline the disbursement process and which is convenient for both the issuing businesses as well as the consumers, reducing processing requirements and load on system resources.

Embodiments of the invention address these and other problems, individually and collectively.

BRIEF SUMMARY

Systems and methods are disclosed for making disbursements to one or more consumers via a hosted disbursement system. In accordance with an embodiment, a method can comprise receiving, at a merchant service provider, a request to make a disbursement to a consumer from a merchant. The request can be received from a merchant server and include disbursement information corresponding to the disbursement. The method can further comprise receiving, at the merchant service provider, a selection of a distribution option from the user, which corresponds to a type of account to receive the disbursement. The method can further comprise receiving, at the merchant service provider, account information from the consumer. The account information is sent to the merchant service provider from a user device, bypassing the merchant server. The method can further comprise processing the disbursement using the account information to transfer funds corresponding to the disbursement to the consumer.

In some embodiments, a method of making disbursements to one or more consumers can comprise receiving, at a merchant service provider, a request to redeem a disbursement to be made to a consumer from a merchant. The request can be redirected to the merchant service provider from a merchant server. The method can further comprise receiving, at the merchant service provider, disbursement information corresponding to the disbursement from a user device; and identifying the disbursement based on the disbursement information. The method can further comprise receiving, at the merchant service provider, account information from the consumer. The account information is sent to the merchant service provider from the user device, bypassing the merchant server; and processing the disbursement using the account information to transfer funds corresponding to the disbursement from the merchant to the consumer.

In some embodiments, a system for making disbursements to one or more consumers can comprise a processor and a memory device including instructions that, when executed by the processor, cause the processor to receive, at a merchant service provider, disbursement information from a merchant server, wherein the disbursement information corresponds to a disbursement to be made to a consumer from a merchant. The instructions, when executed by the processor can further cause the processor to receive, at the merchant service provider, a selection of a distribution option from the user. The distribution option can correspond to a type of account to receive the disbursement. The instructions, when executed by the processor can further cause the processor to receive, at the merchant service provider, account information from the consumer. The account information is sent to the merchant service provider from a user device, bypassing the merchant server. The instructions, when executed by the processor can further cause the processor to process the disbursement using the account information to transfer funds corresponding to the disbursement from the merchant to the consumer.

Embodiments of the present invention provide a number of advantages, including reduced consumer implementation costs, specialized management, and security PCI compliance. Additionally, embodiments of the present invention provide an improved consumer experience, by providing a system in which consumers can specify how their disbursements are made.

These and other embodiments of the invention are described in further detail below.

DETAILED DESCRIPTION

Figure 1:
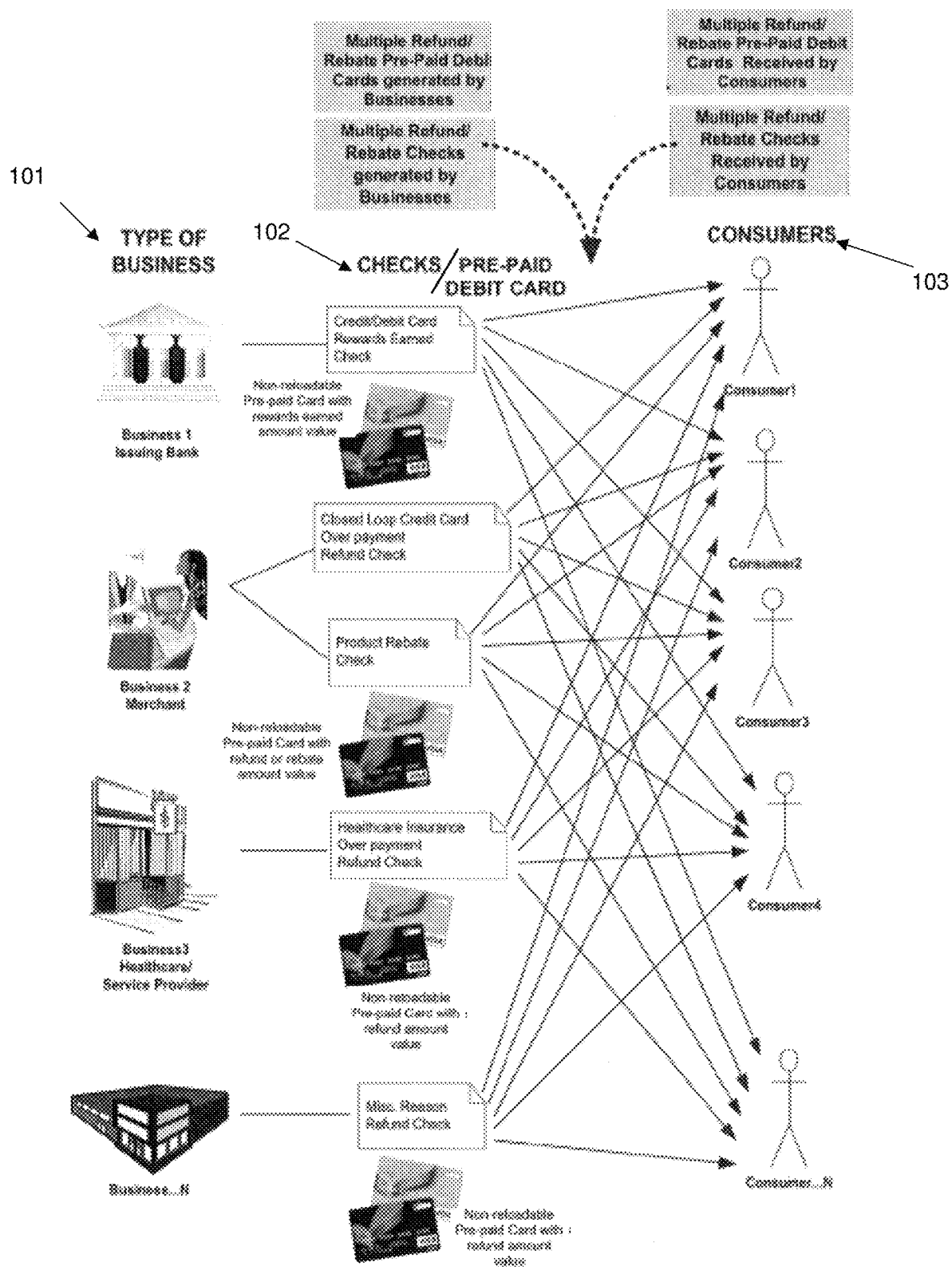
FIG. 1 illustrates a prior art disbursement system.

Embodiments of the present invention provide a hosted disbursement system through which disbursements, such as refunds and rebates, can be claimed by a consumer from a business.

In embodiments of the invention, merchants (or computers operated by the merchants) can off-load all or a portion of disbursement processing to a merchant service provider. Disbursement processing can include verifying and issuing disbursements (e.g., refunds, rebates, one time or recurring payments, and other transfers) to consumers through the merchant service provider. In some embodiments, each merchant's website can redirect a consumer to the merchant service provider using a hosted order page (HOP) to process one or more disbursements for the consumer. In some embodiments, the merchant website can determine that the consumer's disbursement is valid (e.g., corresponds to disbursement information maintained by the merchant) before redirecting the consumer to the merchant service provider. In some embodiments, the merchant service provider can verify that the consumer is due a disbursement and present distribution options to the consumer. For example, the distribution options can include making the disbursement to the consumer's checking account, credit card account, virtual account. Once a distribution option is selected, the consumer can provide account information directly to the merchant service provider, bypassing the merchant. This enables the merchants to avoid the cost and effort of complying with the Payment Card Industry Data Security Standard (PCI DSS) and government regulations regarding storing sensitive account information.

In some embodiments, disbursements can be initiated as part of a larger transaction, or related to a transaction, between a consumer and a merchant. For example, a consumer can purchase a good or service that is associated with an incentive, such as a rebate. The consumer can receive a notification to claim their rebate, such as by receiving a rebate form at purchase or in a subsequent email or other communication. The notification can include an identifier, such as a rebate number, and a merchant website where the rebate can be redeemed. The consumer can visit the website, and provide the rebate identifier (and potentially other disbursement information) to claim the rebate. In these and similar embodiments, a purchase transaction serves as an event that qualifies for a disbursement defined by the merchant. Alternatively, other transactions that do not rely on a purchase can serve as an event that qualifies for a disbursement defined by the merchant. For example, an insurance customer can file a claim with an insurer as per an insurance contract. The insurer can evaluate the claim and determine how much the insurer will pay for the claim. The insurer can then notify the customer to visit the insurer's website to obtain their payment. Similarly, an employment contract between an employee and employer can define a salary to be paid by the employer to the employee at specified times or upon specified events. The employee can visit the employer's website and provide instructions for how the salary (in this case, a recurring disbursement) should be transferred to the employee. Systems and methods for processing these and similar disbursements are discussed in greater detail below.

"Disbursement information" may include a disbursement identifier, such as a coupon, refund, or rebate code, claim number, or other identifier. The disbursement information may also include a disbursement amount. It may also include information about any transaction and/or event that results in a disbursement, such as information about item(s) that have been or are to be purchased, payment amounts, service information, policy details, etc. It may also include information about the consumer making the transactions, such as name, address, email address, purchase history, profile information, and any other information related to the consumer.

"Account information" may include information associated with financial accounts, such credit-card accounts, debit-card accounts, demand accounts (e.g., checking accounts, money market accounts), prepaid accounts, eWallet accounts, etc. Examples of such information include payment account numbers ("PANs"), expiration dates, bank routing numbers, checking account numbers, etc.

A "hosted order page" (HOP) is a third-party hosted webpage that accepts payment information from customers on behalf of merchants. Traditionally, a merchant website typically redirects a customer to an HOP on the third-party's domain/server when the customer selects a 'Buy' or 'Checkout' button from an online shopping cart. Once at the HOP, the customer inputs payment information, such as credit card information. The third-party, which is neither the merchant nor the customer, uses the payment information entered by the customer to process the purchase transaction for the merchant so that the merchant can avoid handling the customer's payment information, and thereby avoid the cost and effort of complying with the Payment Card Industry Data Security Standard (PCI DSS) and government regulations regarding storing sensitive payment information. As described further below, a HOP can be repurposed to serve as a hosted disbursement page, for receiving account information from a consumer to make payments to the consumer from the merchant, rather than the traditional HOP that receives payment information from the consumer to make a payment to the merchant.

A "silent order post" (SOP) is akin to an HOP but with only the sensitive textboxes and other input controls being hosted by the third party. That is, the merchant hosts the order page but the sensitive fields, such as the credit card number and expiration date entry textboxes, are posted only to the third party's servers. Although embodiments of the present invention are generally described with reference to HOPs, SOPs could similarly be used.

A "merchant service provider" can be any entity that provides services in support of electronic transactions. Examples of such services include providing HOPs and/or SOPs to collect account information and/or disbursement information and using that information to process disbursements on behalf of merchants. A merchant service provider may also provide other services such as a payment service, a fraud detection service, etc. Further details regarding a HOP or SOP that could be incorporated into embodiments of the present invention can be found in U.S. patent application Ser. No. 13/549,187 to Anderson and Ser. No. 13/559,250 to McCullagh, each of which is incorporated herein reference in their entirety for all purposes.

Figure 2:
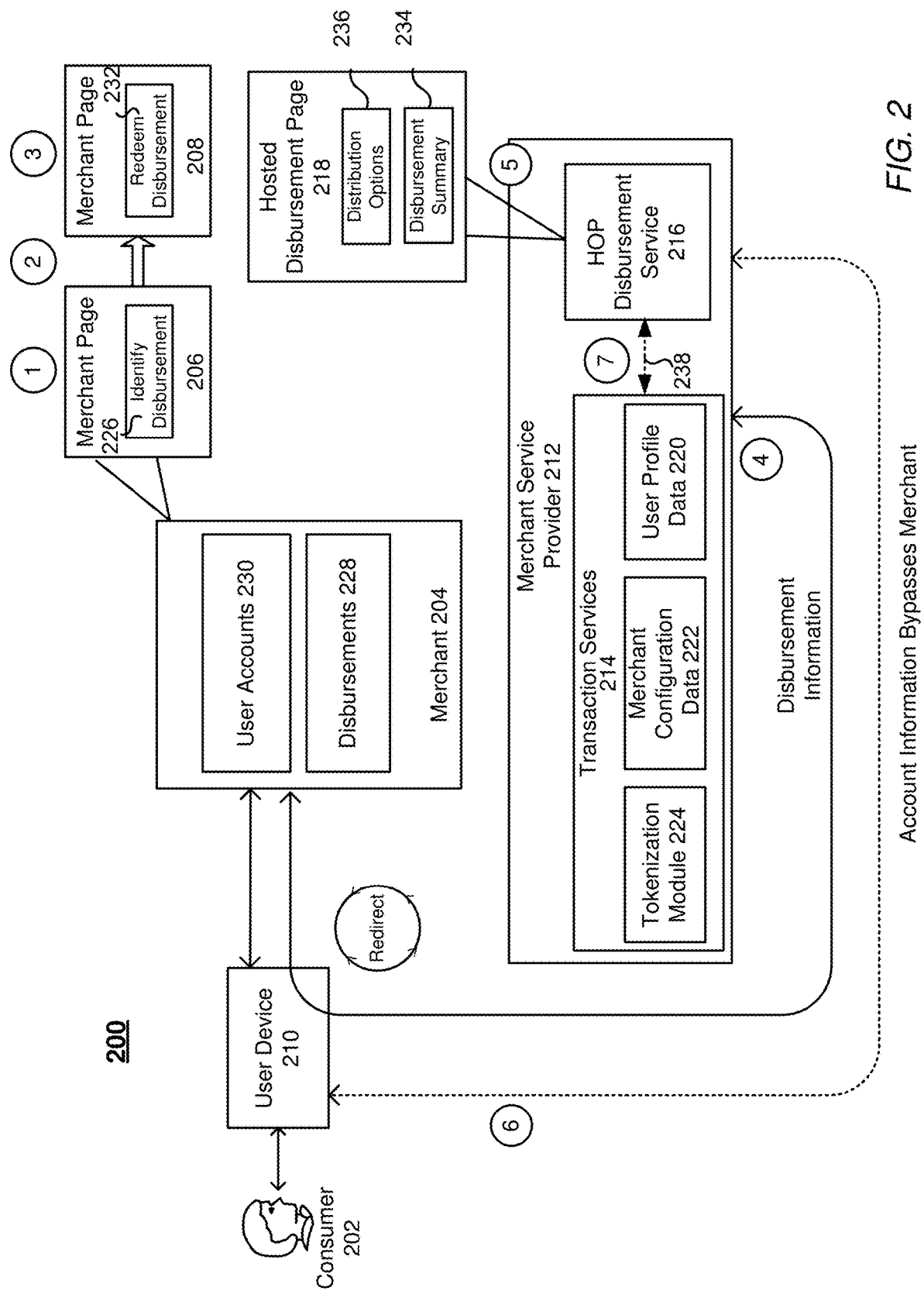
FIG. 2 illustrates a hosted disbursement system, in accordance with an embodiment of the invention.

FIG. 2 illustrates a hosted disbursement system 200, in accordance with an embodiment of the invention. As shown in FIG. 2, a consumer 202 can access a merchant computer 204, and one or more associated merchant pages 206 and 208, using a consumer device 210. The consumer device can include a personal computer, smartphone, laptop or other communication device. In some embodiments, the consumer device can interface with the merchant computer 204 and service provider The merchant 204 can be communicatively connected to a merchant service provider 212 ("service provider"). The service provider 212 can include transaction services 214 and HOP disbursement service 216, which provides a hosted disbursement page 218. The transaction services 214 can include consumer profile/account data 220 and merchant configuration data 222 as well as a tokenization module 224. The service provider 212, acting as a "host", hosts services for clients, such as the merchant 204. According to the illustrated embodiment, the merchant 204 and the consumer 202 can transmit information associated with a disbursement to the service provider 212.

The consumer 202 is, generally, any entity that is a recipient of one-time or recurring payments, rebates, refunds, etc. Non-limiting examples include a person or business entity that purchases or licenses goods and services from merchants via the public Internet or at a retail store using a credit card, debit card, e-check; insurance policy holders; employees; etc. The merchant 204 is, generally, any entity that makes payments per a pre-existing agreement, such as an insurance policy, employment agreement, rebate offer, refund policy, etc.

The service provider 212 may be a third party other than the consumer and merchant, that provides services in support of electronic transactions. Non-limiting examples of such services include services related to payment acceptance processing (e.g., HOP and SOP), credit card authorization, account information tokenization, risk evaluation and management, fraud screening, tax calculation, export compliance verification, delivery address verification, Internet and/ or e-mail address verification, payment crediting, billing, and the like. Service provider 212 may invoke service features of other service providers in support of their service offerings.

The consumer 202 and the merchant 204 may communicate through a network, such as the Internet. When a consumer seeks to redeem a disbursement, the consumer can provide information to the merchant, or the service provider, such that the disbursement can be identified and verified. Non-limiting examples of information collected from the consumer 202 include an offer code, claim number, or other identifier that can be used to identify the disbursement. In some embodiments, the consumer can receive the information from the merchant, such as printed on a receipt, included in an email, or displayed on a merchant device. For example, in some embodiments, an agent of a merchant can review a consumer's disbursement information and approve the disbursement in person. The agent of the merchant can display an image, such as a bar code, QR code, or other machine readable data representation, on a merchant device, such as a tablet or computer. The consumer can capture the image using the consumer device 210 and be redirected to the service provider to complete the disbursement.

Once disbursement and customer-related information is collected by the merchant 204, the merchant transmits at least a portion of the information to the service provider 212. Additional information may be transmitted along with the information described. For example, the merchant 204 may transmit customized data or a specification of service provider 212 services to apply, or to ignore, in the electronic transaction processing that is provided by the service provider 212. Furthermore, according to embodiments described herein, customer-specified service strategies and schedules (e.g. schedules for recurring disbursements) may also be transmitted from the merchant 204 to the service provider 212. Any or all of the information referenced above, which is transmitted from the merchant 204 to the service provider 212, may be transmitted through a network in any suitable protocol. An example of a suitable protocol is Secure Sockets Layer (SSL). The service provider 212 then performs one or more services in relation to the electronic commercial transaction associated with transmitted transaction information.

An example will now be provided with reference to the encircled reference numerals 1-7 provided in FIG. 2. It should be appreciated that the encircled reference numerals are provided for illustrative convenience and are not intended to limit ways in which data may flow or the order in which steps may be executed in the system 200. For example, data may flow to and from any component of the system 200 in any order.

Referring to encircled reference numeral 1 of FIG. 2, this example begins with the consumer 202 visiting the merchant page 206 which is provided by a merchant web server 204. While visiting the merchant page 206, the consumer 202 can provide disbursement information for a disbursement to be received by the consumer from the merchant. Depending on the type of disbursement, and the merchant, different disbursement information may be required from the consumer. For example, where the merchant is an insurer and the consumer is a claimant, the claimant may be required to provide a claim number, policy number, and policy holder name. Where the merchant is an online store and the consumer is a purchaser of goods, the consumer may be required to provide an order number, purchase date, and delivery address. In some embodiments, other disbursement information may be required from the consumer. In some embodiments, the merchant may associate disbursements with consumer accounts, such that the consumer can log in to their account via the merchant page 206 and identify any disbursements they are due. Once the consumer has entered the requested disbursement information, the consumer can select an "Identify Disbursement" button 226.

Referring now to encircled reference numeral 2, when the consumer selects the "Identify Disbursement" button 226, the merchant server 204 can compare the disbursement information provided by the consumer to pending disbursements 228 maintained by the merchant 204. In some embodiments, the merchant 204 can maintain pending disbursements 228 linked to consumer accounts 230, for example where a disbursement is a result of a prior transaction between the merchant and consumer such as a payment for an insurance claim. In some embodiments, pending disbursements 228 can be maintained without a pre-existing consumer account, for example where a consumer purchases a product from a third party retailer and receives a rebate code that can be redeemed with the merchant. Pending disbursements 228 can also include terms of any current incentives being offered by the merchant. For example, a merchant may offer a $10 rebate to any consumer who purchases four qualifying widgets. In this example, the consumer can provide disbursement information such as identifiers for four purchased widgets (UPC numbers, SKU codes, receipts, etc.). The disbursement information (identifiers for the purchased widgets) can be compared to the offer terms to determine if the offer terms have been met. If a corresponding pending disbursement is identified based on the disbursement information provided by the consumer 202, merchant page 208 can be provided which includes a description of the pending disbursement. As indicated at encircled reference numeral 3, the consumer can view the details of the disbursement and select "Redeem Disbursement" button 232 to redeem the disbursement.

As indicated at encircled reference numeral 4 of FIG. 2, when the consumer 202 selects the "Redeem Disbursement" button 232 on the merchant page 208, the merchant server 204 sends at least a portion of the disbursement information to the HOP disbursement service 216 and redirects the consumer to the HOP disbursement service. For example, when selected, the "Redeem Disbursement" button 232 may redirect the consumer device 108 to a URL corresponding to the HOP disbursement service 216. In some embodiments, disbursement information can be encrypted, e.g. using a one-way hash, and communications with the service provider 212 can be made over a secure connection, e.g. using SSL.

Referring to encircled reference numeral 5, the HOP disbursement service 216 provides hosted disbursement page 218 to the consumer 202. For example, the hosted payment page 218 may include a summary of the disbursement information 234 and present a plurality of distribution options 236. The plurality of distribution options 236 can include input fields that enable consumers to provide account information directly to the service provider 212, bypassing the merchant 204. Referring to encircled reference numeral 6, the consumer 202, via the consumer device 210, inputs the account information. For example, the consumer 102 can input credit card information, checking account information, or other account information such as billing address information into the input fields and then selects a "Submit" button. Using the HOP, the consumer's account information bypass the merchant and therefore the merchant does not have to be PCI compliant. In some embodiments, the merchant can maintain a settlement account with the service provider. When the consumer redeems a disbursement, the service provider can transfer the appropriate amount from the merchant's settlement account to the consumer's account using the disbursement information and account information provided by the consumer.

The HOP disbursement service 216 can make the disbursement according to the consumer's selected distribution option using the consumer's provided account information, for example by transferring the appropriate funds to an existing credit or debit account using an original credit transaction (OCT), by issuing a new gift card, reloadable prepaid card or similar account, or by loading an existing/issuing a new virtual account in an electronic wallet. In embodiments of the invention, AFT and OCT messages can be used to debit and credit issuer accounts when, for example, funds are being transferred from a business account (e.g., a merchant account) to a different account (e.g., a prepaid account that will be used by the consumer). An OCT message is used to submit an original credit through VisaNet to the recipient's issuer. An AFT (Account Funding Transaction) is a transaction designed to supply funds to another account such as a Visa prepaid, debit, ATM card or on-line account, and is explained in more in U.S. Pat. No. 8,016,185, which is herein incorporated by reference in its entirety for all purposes.

In some embodiments, as shown at encircled reference numeral 7, when the consumer 202 submits their account information to the HOP disbursement service, the HOP disbursement service can optionally forward 238 the account information and disbursement information received to the transaction services 214 for additional processing. For example, transaction services 214 can determine, based on the consumer profile data 220, whether the consumer already has an account with the service provider 214. If the consumer does not have an account, the service provider 212 can create one. The account information and disbursement information can be stored in the consumer's account. In some embodiments, the service provider 212 can maintain standing instructions for the consumer in the consumer's account. For example, the consumer can specify that any disbursements from particular merchants are to be made to a particular account. Subsequently, when the consumer redeems a disbursement from one of the particular merchants, the HOP disbursement service can automatically disburse the appropriate amount to the particular account, without requiring additional consumer input.

Further, in some embodiments, the merchant service provider 212 can tokenize the account information provided by the consumer using tokenization module 224 to create a disbursement token for the account information. The disbursement token can be sent by the service provider to the merchant, which can store the disbursement token in a consumer account associated with the consumer. Subsequently, when the consumer redeems a disbursement from the merchant, the merchant can provide the disbursement token along with the disbursement information to the HOP disbursement service for processing, without requiring additional consumer input.

In some embodiments, transaction services 214 can further include fraud and risk services that can confirm the disbursements are not fraudulent. For example, the system can check for employee fraud and/or consumer fraud (e.g., confirm that an employee is not making disbursements to friends or family, or confirm the identity of the requesting consumer). Additionally, security checks related to government anti-terror or similar regulations can be performed.

Once the hosted disbursement system receives the instructions for disbursement, and any additional transaction services have been applied, the hosted disbursement system can confirm that the merchant has funds available to cover the disbursement. For example, the merchant can maintain a settlement account with the service provider. If the settlement account includes sufficient funds, the disbursement can be completed by transferring the funds for the disbursement from the settlement account to the consumer's specified account based on their selected distribution option. In some embodiments, the hosted disbursement system can communicate with an acquirer or other banking entity associated with the merchant to confirm that funds are available from the merchant to send to the consumer. This process may be implemented by software at the merchant, merchant processor, bank, or payment processor.

Figure 3:
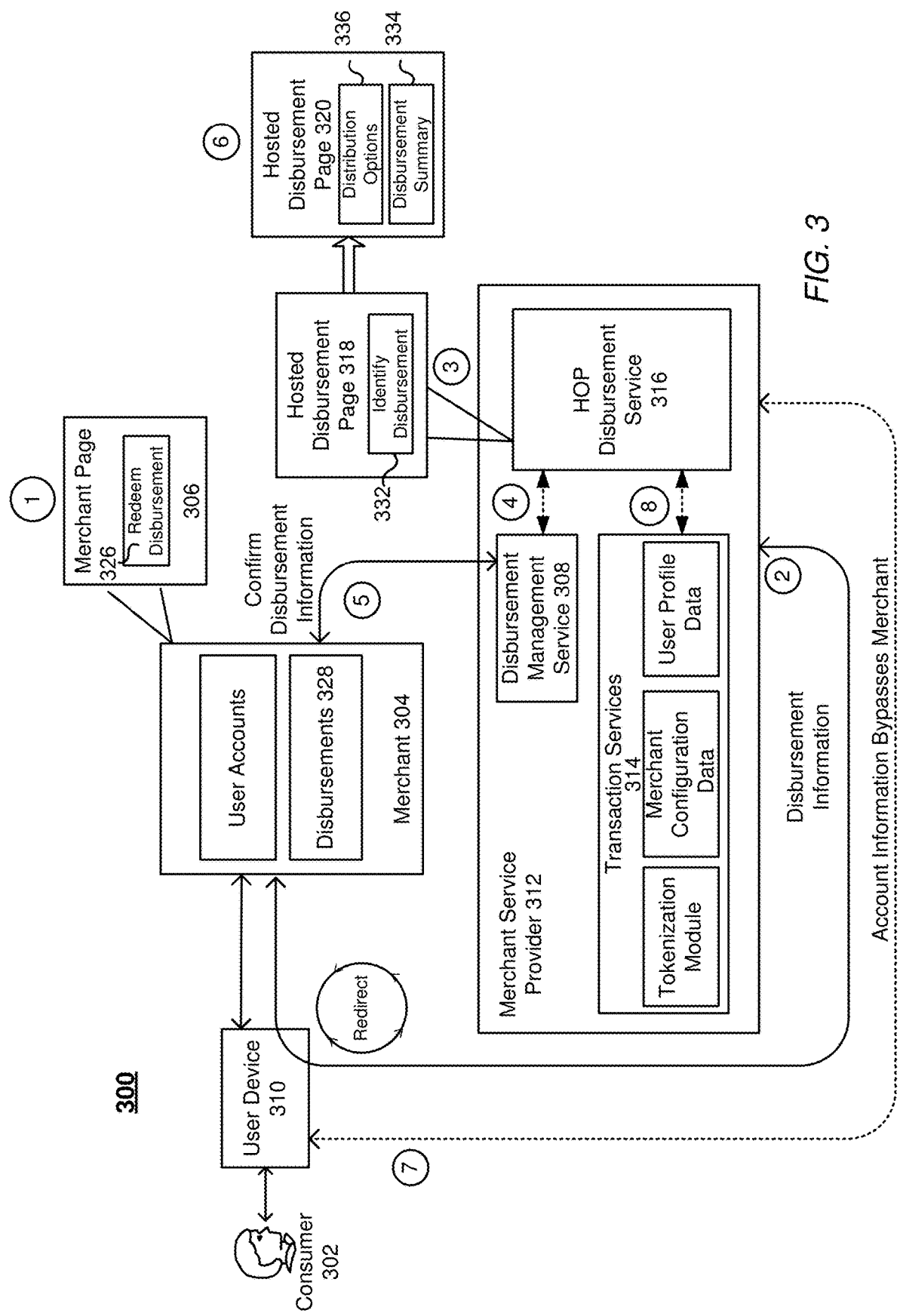
FIG. 3 illustrates an alternative hosted disbursement system, in accordance with an embodiment of the invention.

FIG. 3 illustrates an alternative hosted disbursement system, in accordance with an embodiment of the invention. The embodiment shown in FIG. 3 is a similar hosted disbursement system to that shown in FIG. 2, however additional disbursement processing has been transferred from the merchant to the service provider. As shown in FIG. 3, a consumer 302 can access a merchant computer 304 using a consumer device 310 to request a disbursement. The consumer 302 can access merchant page 306 to begin the disbursement process. In some embodiments, the consumer can enter disbursement information, such as a disbursement identifier, into one or more fields on the merchant page 306 before being redirected to merchant service provider 312 ("service provider"). In some embodiments, the consumer can be redirected to the service provider 312 before entering any disbursement information. Once redirected, the consumer can be prompted to provide the disbursement information directly to the service provider 312 via hosted disbursement page 318. The hosted disbursement page can include one or more fields 332 to enter the disbursement information. After the consumer has provided the disbursement information, the HOP disbursement service can forward the disbursement information to the disbursement management service 308 to identify a corresponding disbursement. In some embodiments, the disbursement management service 308 can communicate with the merchant to identify the corresponding disbursement. After the disbursement has been identified, hosted disbursement page 320 can be provided to the consumer, which includes a summary of the disbursement 334 and a plurality of distribution options 336. The plurality of distribution options can include one or more fields into which the consumer can provide account information to be used to make the disbursement.

Similar to FIG. 2, in FIG. 3 service provider 312 can include transaction services 314 and HOP disbursement service 316. Service provider 312 can further include disbursement management service 308. In some embodiments, merchants can use disbursement management service 308 to track, verify, and manage their disbursements. For example, merchants can provide disbursement information corresponding to pending disbursements 328 to the disbursement management service 308. The disbursement information can be provided in a batch data file periodically, or updated in real time.

An example will now be provided with reference to the encircled reference numerals 1-8 provided in FIG. 3. It should be appreciated that the encircled reference numerals are provided for illustrative convenience and are not intended to limit ways in which data may flow or the order in which steps may be executed in the system 300. For example, data may flow to and from any component of the system 300 in any order.

Referring to encircled reference numeral 1 of FIG. 3, this example begins with the consumer 302 visiting the merchant page 306 which is provided by a merchant web server 304. While visiting the merchant page 306, the consumer 302 can provide disbursement information for a disbursement to be received by the consumer from the merchant. As described above with respect to FIG. 2, different merchants may require different disbursement information from the consumer. Once the consumer has entered the requested disbursement information, the consumer can select a "Redeem Disbursement" button 326. In some embodiments, merchant page 306 may request no disbursement information from the consumer. Instead, merchant page 306 may display a summary of available disbursements (current rebate offers, refund procedures, etc.) and include the "Redeem Disbursement" button 326.

Referring now to encircled reference numeral 2, when the consumer selects the "Redeem Disbursement" button 326, the merchant server 304 sends any disbursement information provided by the consumer to the HOP disbursement service 316 and redirects the consumer to the HOP disbursement service. For example, when selected, the "Redeem Disbursement" button 332 may redirect the consumer device 308 to a URL corresponding to the HOP disbursement service 316. In some embodiments, disbursement information can be encrypted, e.g. using a one-way hash, and communications with the service provider 312 can be made over a secure connection, e.g. using SSL. In some embodiments, where the merchant page does not request any disbursement information from the consumer, the consumer can be redirected to the service provider 312 and the merchant can provide a merchant identifier, or other information that can be used by the service provider to identify the merchant.

At encircled reference numeral 3, hosted disbursement page 318 can be provided to the consumer. In some embodiments, if disbursement information was sent by the merchant with the redirect at reference numeral 2, this page can be bypassed. If disbursement information was not sent by the merchant, the consumer can be prompted to enter the disbursement information in one or more fields 332 on hosted disbursement page 318. In some embodiments, because different merchants can require different disbursement information, the service provider can determine which fields are included in the hosted disbursement page 318 based on a merchant identifier that was included with the redirected request. The service provider can determine the appropriate fields to include based on the merchant configuration data in transaction services 314. At reference numeral 4, the provided disbursement information can be sent from the HOP disbursement service 316 to the disbursement management service 308 to identify and verify the disbursement requested by the consumer. In some embodiments, the disbursement management service 308 can compare the disbursement information against pending disbursements maintained by the service provider. In some embodiments, if the disbursement management service 308 cannot identify a corresponding disbursement based on the disbursement information provided by the consumer, at reference numeral 5, the disbursement management service 308 can communicate with the merchant 304 to identify the disbursement. For example, the service provider 312 may have incomplete information about pending disbursements if the merchant provides periodic updates of disbursement information to the service provider.

At reference numeral 6, once the disbursement has been identified, hosted disbursement page 320 can be provided to the consumer. Similar to FIG. 2, hosted disbursement page 320 may include a summary of the disbursement information 334 and present a plurality of distribution options 336. As described above, the plurality of distribution options 336 can include input fields that enable consumers to provide account information directly to the service provider 312, bypassing the merchant 304. Referring to encircled reference numeral 7, the consumer 302, via the consumer device 310, inputs the account information. For example, the consumer 302 can input credit card information, checking account information, or other account information such as billing address information into the input fields and then selects a "Submit" button. Optionally, at reference numeral 8, other transaction services can be applied to the disbursement request, as described above with respect to FIG. 2. As described above, once the hosted disbursement system receives the instructions for disbursement, the hosted disbursement system can confirm that the merchant has funds available to cover the disbursement before transferring funds from the merchant to the consumer.

Figure 4:
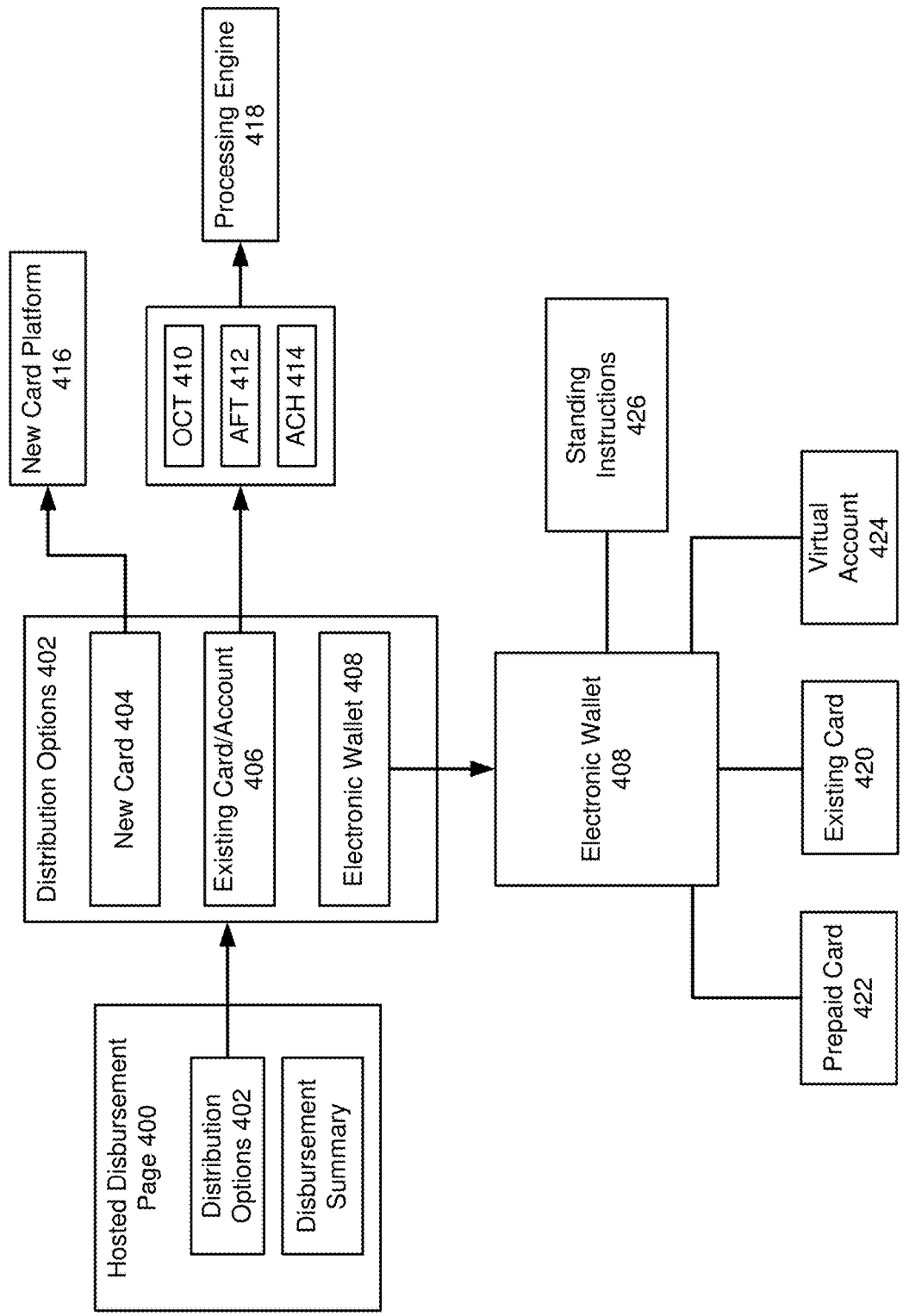
FIG. 4 illustrates distribution options in a hosted disbursement system, in accordance with an embodiment of the invention.

FIG. 4 illustrates distribution options in a hosted disbursement system, in accordance with an embodiment of the invention. As described above, a hosted disbursement webpage 400 can provide a plurality of distribution options 402 from which a consumer can select to complete a disbursement. The hosted disbursement service can be extensible, such that support for additional distribution options can be added. As shown in FIG. 4, supported distribution options can include, but are not limited to, a new account 404, such as a new prepaid, debit, or credit account, an existing account 406, such as a prepaid, debit, credit, or checking account, or an electronic wallet account 408. When a distribution option is selected, one or more input fields can be displayed to the consumer corresponding to information needed to process the selected distribution option. For example, to make a disbursement to an existing account, fields can be displayed to input account information, and to make a disbursement to an electronic wallet account fields can be displayed for the consumer to log into their electronic wallet.

Once the system has received a selection of a distribution method for the disbursement, and has received the appropriate account information from the consumer, the system can conduct the disbursement. For example, when the consumer chooses to have funds disbursed to an existing account, an OCT 410, AFT 412, check 414, or other appropriate transaction message can be used to transfer the funds via a processing engine 418, such as a payment processing network or automated clearing house (ACH). For example, in an OCT 410, the system can push funds to the requester's existing payment card. The system may utilize APIs at the payment processing network for OCT transactions. Alternatively, when the consumer chooses to receive funds via a new account 404, the system can issue a guest card, a reloadable prepaid card, etc. In this embodiment, the system can connect to a new card issuing platform 416 to have a new card sent to the consumer.

In some embodiments, the consumer can select their electronic wallet 135 via the distribution options list or via a stand-alone electronic wallet button displayed on the hosted disbursement page 400. The electronic wallet button can be implemented as a link that directly connects to a payment processing network. When the consumer selects the electronic wallet option via distribution options 402 on the hosted disbursement webpage 400, the consumer can be directed to their electronic wallet 408 to select options to disburse funds associated with the electronic wallet via a variety of methods. For example, the requester can direct the disbursement funds to an existing card account 420, authorize a new prepaid card 422, or establish a virtual prepaid account 424. The consumer can choose any of these options through the electronic wallet or hosted disbursement webpage to receive the disbursement.

In some embodiments, the hosted disbursement system can be used for recurring disbursements. The consumer can provide standing instructions, to the hosted disbursement system or the electronic wallet, that can define how disbursements are to be made. The standing instructions can include merchant-specific and/or account specific instructions. For example, the consumer can set instructions to transfer recurring insurance claim payments to a checking account, and all other disbursements to a prepaid account. In some embodiments, when a disbursement is made automatically based on a consumer's standing instructions, the consumer can be notified of the disbursement. Notifications can come in a variety of formats. The consumer can provide an SMS or phone number for an SMS notification or an e-mail address for e-mail notifications. In some embodiments, the service provider or electronic wallet could have an internal messaging system (e.g., secure messaging integrated with an electronic wallet platform) that can send notifications to a consumer's phone, email address, application, etc.

Figure 5:
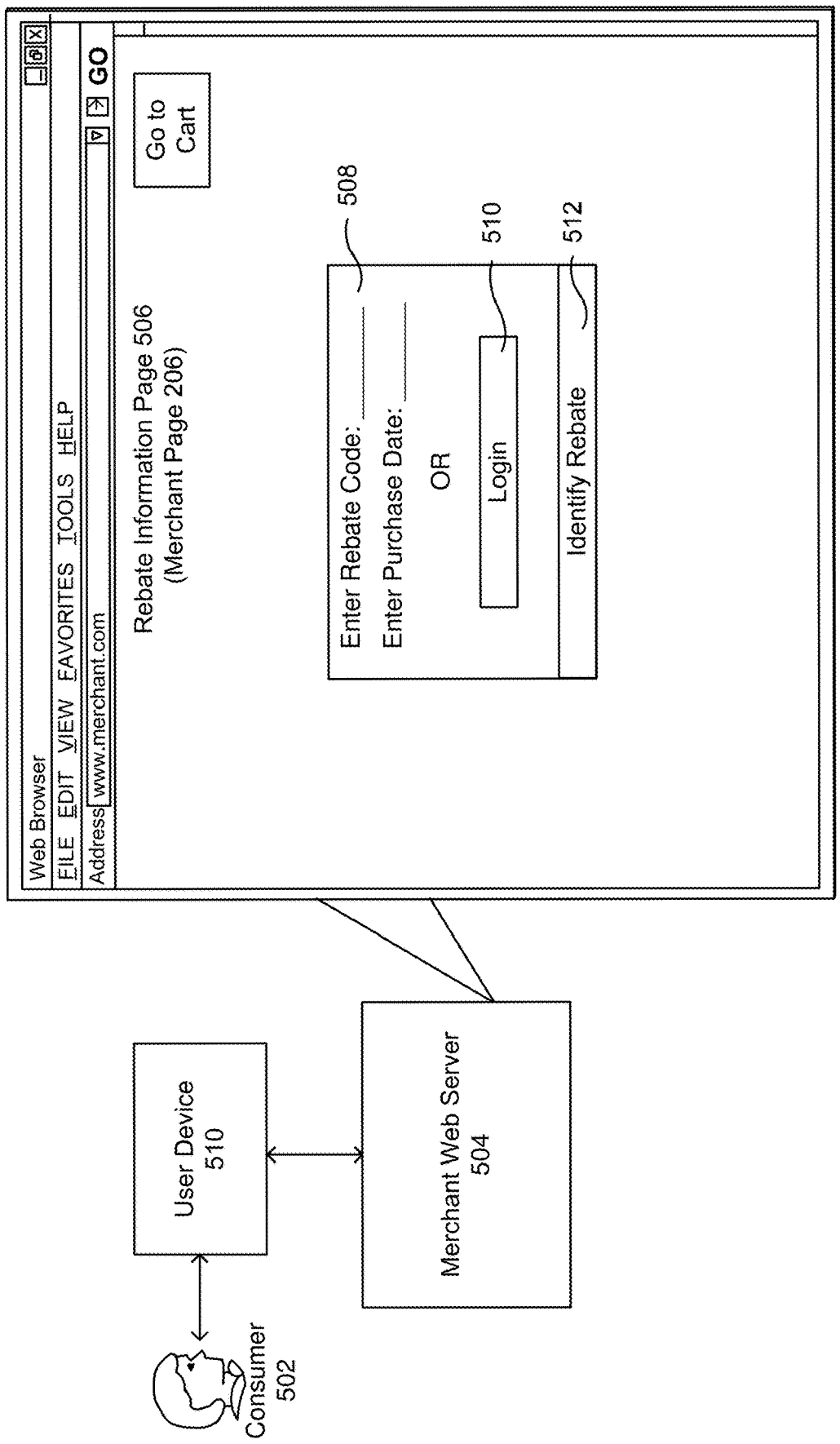
FIG. 5 provides an illustration of an example merchant webpage, in accordance with an embodiment of the invention.

FIG. 5 provides an illustration of an example merchant webpage, in accordance with an embodiment of the invention. As shown in FIG. 5, a consumer 502 can access a merchant website hosted by a merchant web server 504 using a consumer device 510, such as a smartphone, tablet, computer, or other communication device. The consumer 502 can navigate the merchant website to a rebate information page 506 (corresponding, e.g., to merchant page 206 shown in FIG. 2). The rebate information page 506 can include a plurality of fields 508 that can receive disbursement information. As described above, in some embodiments the rebate information page 506 can be provided by the service provider. For example, in the embodiment of FIG. 5, the disbursement information required can include a rebate code and a purchase date. As described above, different merchants may require different disbursement information. In some embodiments, merchants can associate disbursement information related to a particular consumer with the consumer's account. Accordingly, a login option 510 can be presented. The consumer can elect to login, for example by providing a consumer name and password, and the disbursement information can be retrieved from their account. Once the consumer has entered the required disbursement information, the consumer can select an "Identify Rebate" button 512. The disbursement information can then be used to determine whether a disbursement is due to the consumer, as described above.

Figure 6:
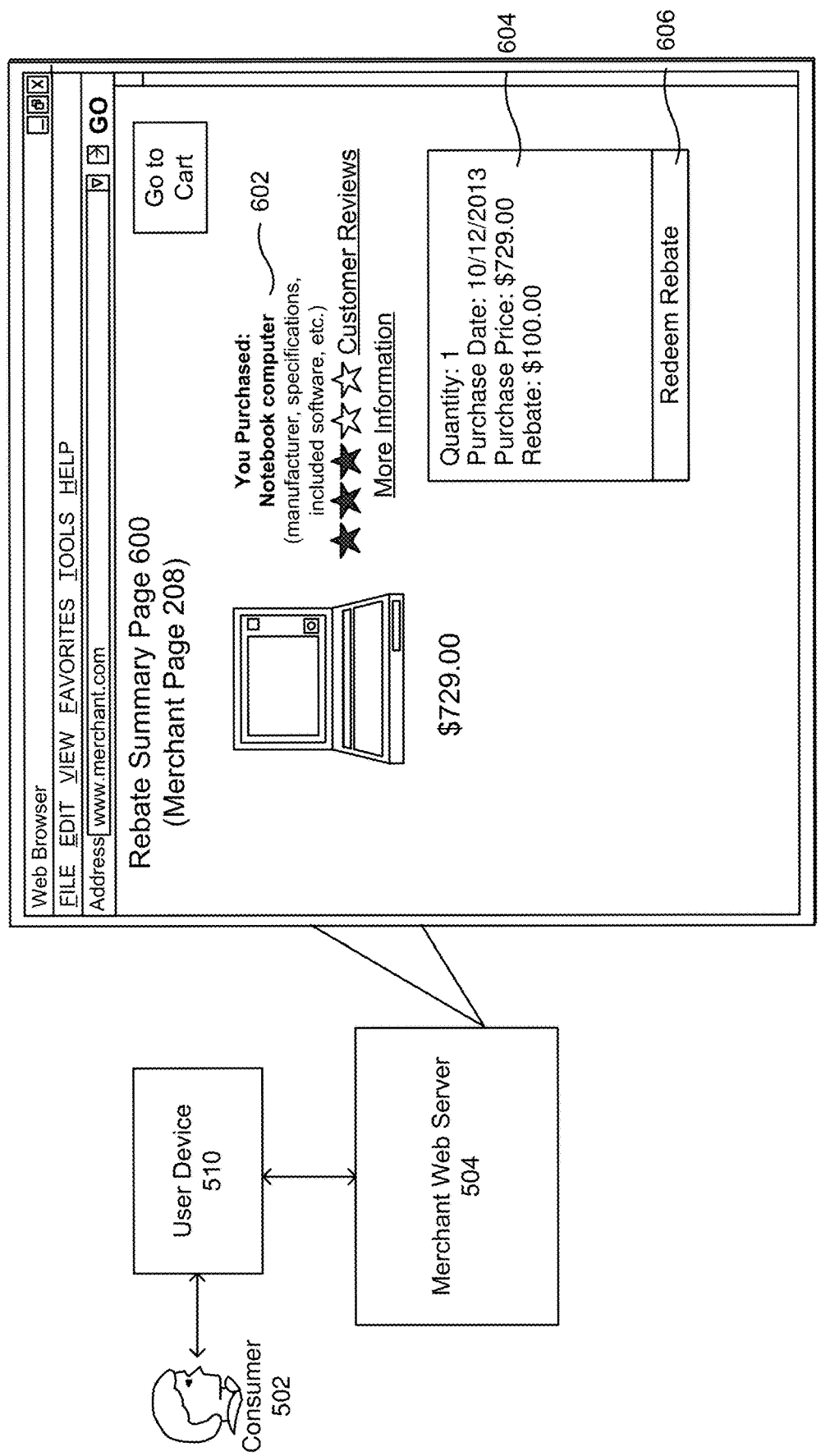
FIG. 6 provides an illustration of an example merchant webpage, in accordance with an embodiment of the invention.

FIG. 6 provides an illustration of an example merchant webpage, in accordance with an embodiment of the invention. As shown in FIG. 6, once a disbursement has been identified, a rebate summary page 600 (corresponding, e.g., to merchant page 208) can be provided to the consumer. The rebate summary page can include a summary of the disbursement, which can include a summary of the transaction that lead to the disbursement 602 and the amount of the disbursement 604. For example, in the embodiment of FIG. 6, the consumer purchased a notebook computer which qualified for a $100 rebate. The consumer can select a "Redeem Rebate" button 606, to claim the rebate.

Figure 7:
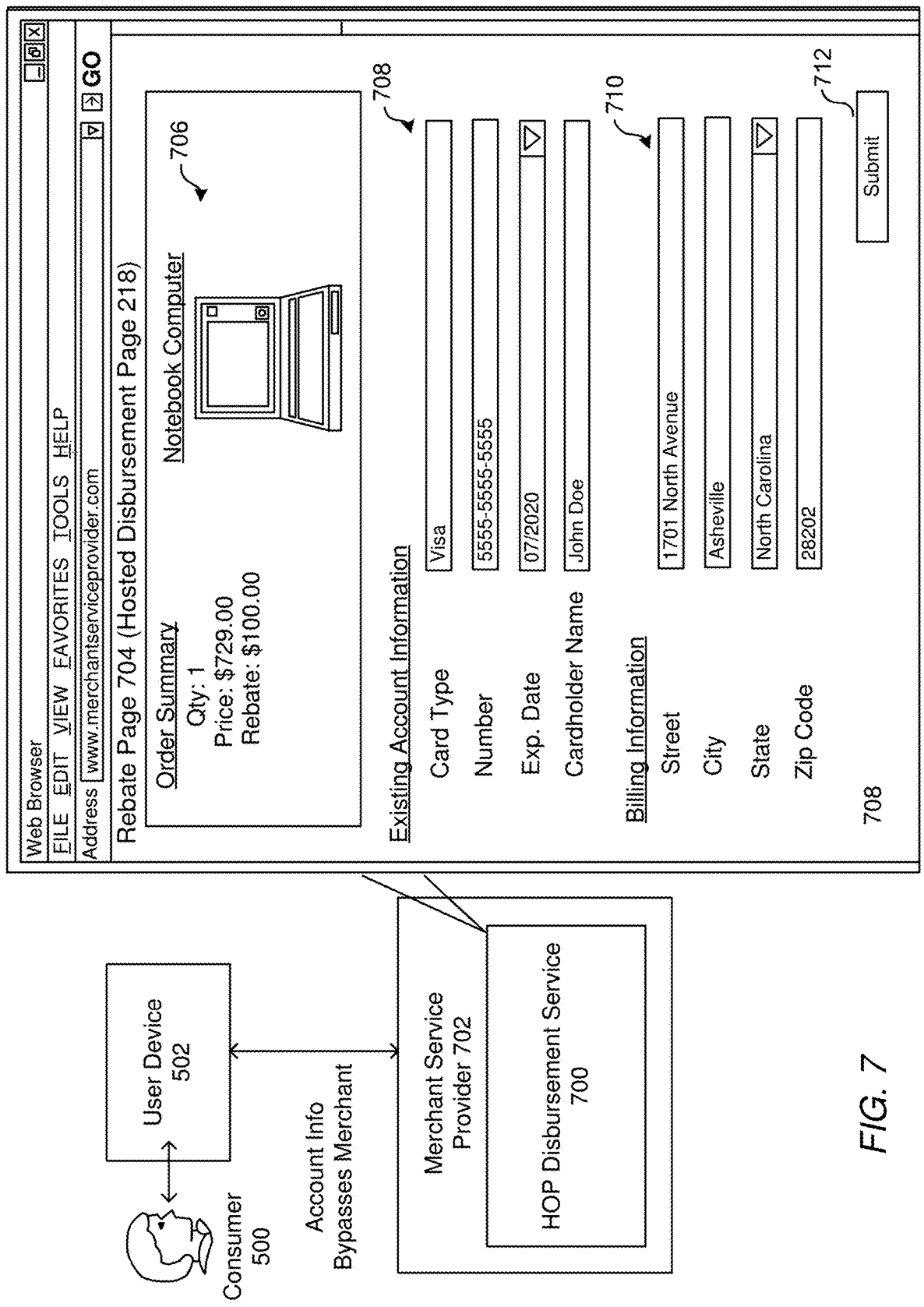
FIG. 7 provides an illustration of an example hosted disbursement webpage, in accordance with an embodiment of the invention.

FIG. 7 provides an illustration of an example hosted disbursement webpage, in accordance with an embodiment of the invention. As described above, when the consumer redeems a rebate, the consumer can be redirected to a hosted disbursement service 700 at a service provider 702. The hosted disbursement service 700 can provide a Rebate Page 704 (corresponding, e.g., to hosted disbursement page 218). The consumer can provide account information for the disbursement to the hosted disbursement service 700 through the hosted disbursement page, bypassing the merchant. The rebate page 704 can include a summary of the disbursement 706 and a plurality of fields 708, 710 for account information. For example, in the embodiment shown in FIG. 7, the consumer can enter existing account information in fields 708, including a payment card account, card number, and other details. The consumer can also provide billing address information in fields 710. Although the embodiment shown in FIG. 7 requests existing account information corresponding to an existing debit or credit card account, information for other account types, as described above, could also be requested. Once the consumer has entered their account information, the consumer can select the "Submit" button 712 to complete the disbursement.

Figure 8:
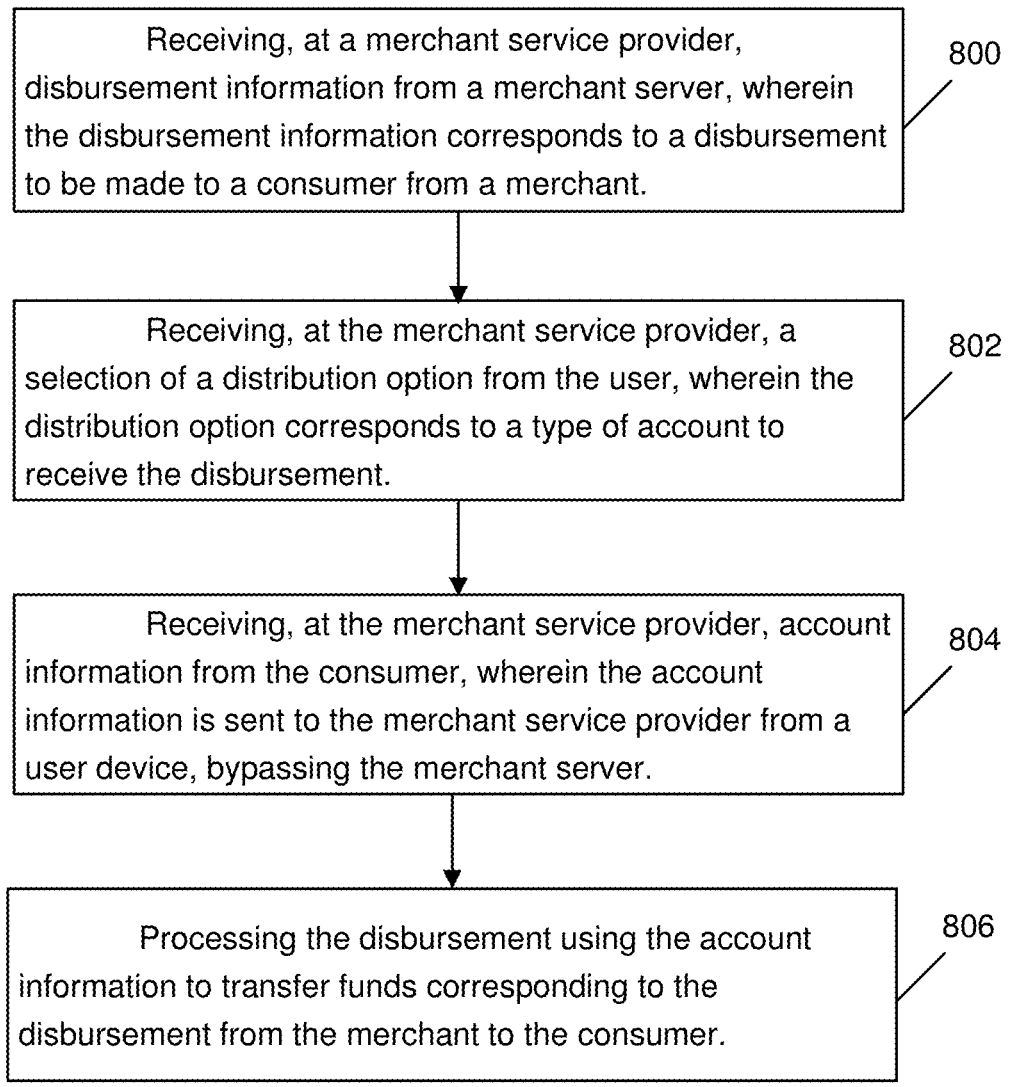
FIG. 8 illustrates a method for providing a disbursement to a consumer through a hosted disbursement system, in accordance with an embodiment of the invention.

FIG. 8 illustrates a method for providing a disbursement to a consumer through a hosted disbursement system, in accordance with an embodiment of the invention. At 800, a merchant service provider receives a request to make a disbursement to a consumer from a merchant. As described above, the request can be redirected from a merchant server and can include disbursement information corresponding to the disbursement. The disbursement information can be received by the merchant server from the consumer via one or more web pages provided by the merchant server. The merchant server can identify the disbursement by comparing the disbursement information from the consumer to disbursement information maintained by the merchant server before sending the request to the merchant server provider. In some embodiments, the request from the merchant server does not include disbursement information. Instead, when the disbursement request is received by the merchant service provider, a hosted disbursement page can be provided that includes fields to receive the disbursement information. In some embodiments, the fields included in the hosted disbursement page can vary depending on the merchant from which the request is redirected. The merchant service provider can then identify the disbursement by comparing the disbursement information from the consumer to disbursement information maintained by the merchant service provider. If a matching disbursement is not identified in the disbursement information maintained by the merchant service provider, a request can be sent to the merchant to compare the disbursement information from the consumer to disbursement information maintained by the merchant server. If no disbursement can be identified in the disbursement information maintained by the merchant service provider or the merchant server, an error message can be returned to the consumer.

At 802, the merchant service provider can receive a selection of a distribution option from the user. The distribution option can correspond to a type of account to receive the disbursement, such as an existing debit, credit, or checking account, or a new prepaid account, or an electronic wallet account. At 804, the merchant service provider can receive account information from the consumer. The account information is sent to the merchant service provider from a user device, bypassing the merchant server. The account information can be received through a hosted disbursement page that is hosted by the merchant service provider. The hosted disbursement page includes a summary of the disbursement and a plurality of fields to receive the account information. At 806, the disbursement can be processed by the merchant service provider using the account information to transfer funds corresponding to the disbursement from the merchant to the consumer. In some embodiments, the transfer can be a payment to an existing account, such as an original credit transaction (OCT), automated clearinghouse (ACH) payment, or an account funding transaction (AFT).

In some embodiments, the merchant service provider can receive standing instructions from the user that identify an account to which subsequent disbursements are to be made automatically. When a subsequent request to make a disbursement is received, the merchant service provider can automatically make the disbursement according to the standing instructions, and send a notification to the user indicating that the disbursement has been made.

As described above, in some embodiments disbursements may be made to a consumer's electronic wallet instead of, or in addition to, the consumer's credit, debit or prepaid account. Some features of an exemplary wallet can be found in U.S. Provisional Patent Application No. 61/466,409, entitled: "Electric Wallet", by Edward Katzin, filed on Mar. 22, 2011, which is herein incorporated by reference in its entirety for all purposes. An electronic wallet may be used in a variety of transactions, including but not limited to eCommerce, social networks, money transfer/personal payments, mobile commerce, proximity payments, gaming, and/or the like. For example, consumers may engage in eCommerce via the electronic wallet for retail purchases, digital goods purchases, and utility payments. consumers may also, for example, use the electronic wallet to purchase games or gaming credits from gaming websites, and transfer funds to friends via social networks. Further, for example, consumers may also use the electronic wallet on a smart phone for retail purchases, buying digital goods, NFC/RF payments at point of sale (POS) terminals. Thus, by making disbursements to a consumer's electronic wallet, the disbursed funds are made available for use by the consumer in a variety of transactions.

Figure 9:
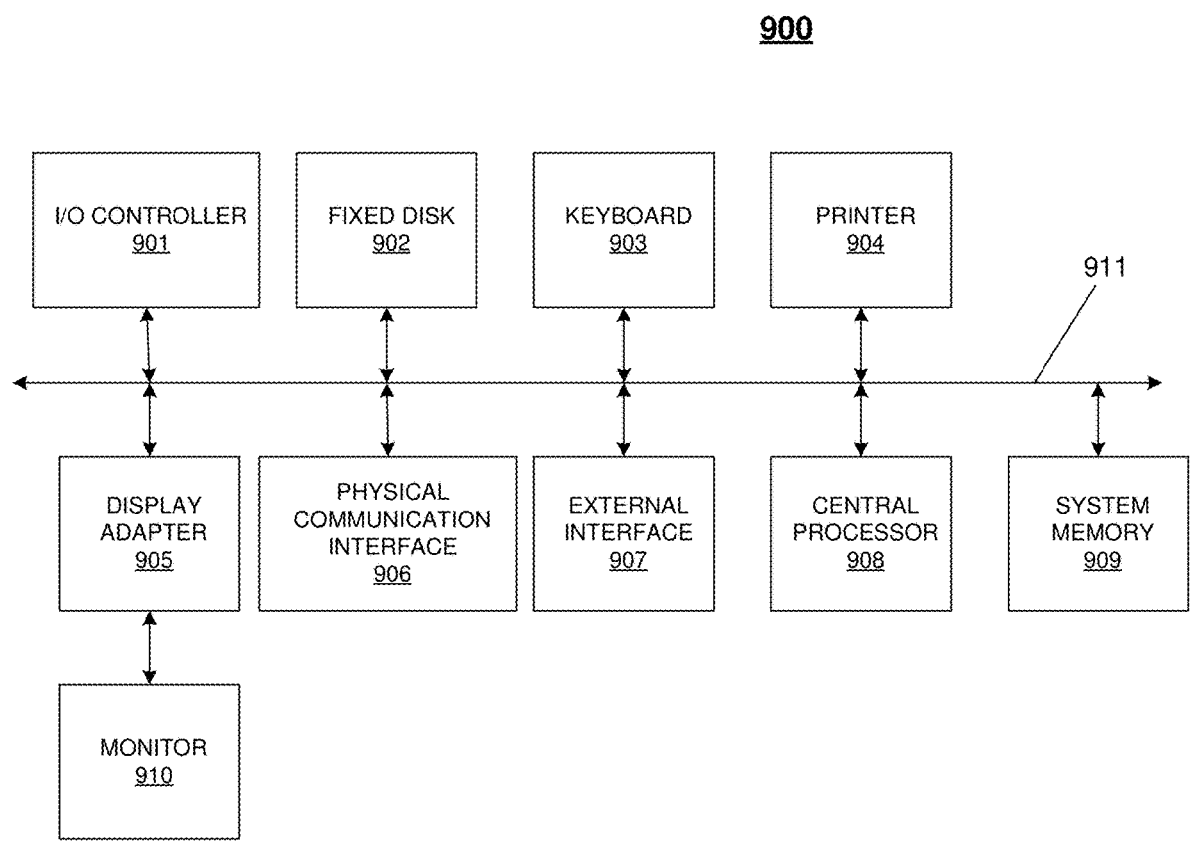
FIG. 9 illustrates an exemplary computer system used to access the disbursement platform in accordance with an embodiment of the invention.

FIG. 9 illustrates an exemplary computer system 900, in which various embodiments may be implemented. The system 900 may be used to implement any of the computer systems described above (e.g., client computer, a server computer at the card association, a server computer at the issuer, a computer apparatus at the merchant, etc.). The computer system 900 is shown comprising hardware elements that may be electrically coupled via a bus 911. The hardware elements may include one or more central processing units (CPUs) 908, one or more input devices (e.g., a mouse, a keyboard 903, etc.), and one or more output devices (e.g., a display device 905, 910, a printer 904, etc.). The computer system 900 may also include one or more storage devices 902, 909. By way of example, the storage device(s) 902, 909 can include devices such as disk drives, optical storage devices, solid-state storage device such as a random access memory ("RAM") and/or a read-only memory ("ROM"), which can be programmable, flash-updateable and/or the like. The computer system 900 may also include an I/O controller 901 and physical communication interface 906, such as a serial, USB, or other communication port, to interface with the one or more input devices and one or more output devices described above.

The computer system 900 may additionally include a computer-readable storage media reader, a communications system (e.g., a modem, a network card (wireless or wired), an infra-red communication device, etc.), and working memory 909, which may include RAM and ROM devices as described above. The communication system can be connected through an external interface 907.

The computer-readable storage media reader can further be connected to a computer-readable storage medium, together (and, optionally, in combination with storage device(s) 908) comprehensively representing remote, local, fixed 902, and/or removable storage devices plus storage media for temporarily and/or more permanently containing, storing, transmitting, and retrieving computer-readable information. The communications system may permit data to be exchanged with the network and/or any other computer described above with respect to the system 900.

The computer system 900 may also comprise software elements, located within a system memory 909, including an operating system and/or other code, such as an application program (which may be a client application, Web browser, mid-tier application, RDBMS, etc.). It should be appreciated that alternate embodiments of a computer system 900 may have numerous variations from that described above. For example, customized hardware might also be used and/or particular elements might be implemented in hardware, software (including portable software, such as applets), or both. Further, connection to other computing devices such as network input/output devices may be employed.

Storage media and computer-readable media for containing code, or portions of code, can include any appropriate media known or used in the art, including storage media and communication media, such as but not limited to volatile and non-volatile, removable and non-removable media implemented in any method or technology for storage and/or transmission of information such as computer-readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, data signals, data transmissions, or any other medium which can be used to store or transmit the desired information and which can be accessed by the computer. Based on the disclosure and teachings provided herein, a person of ordinary skill in the art will appreciate other ways and/or methods to implement the various embodiments.

Embodiments of the invention provide for a number of advantages. For example, in embodiments of the invention, many different businesses may issue disbursements (e.g., rebates, refunds, etc.) and these can be handled at a universal platform. The platform may handle any data conversions necessary to debit appropriate business accounts while crediting a single prepaid account (or other account) used by a consumer. As a result, the consumer does not need to handle many different types of disbursements, and can use only one type of disbursement. Further, since fewer types of disbursements are provided to consumers, fewer computing resources are needed.

The above description is illustrative and is not restrictive. Many variations of the invention may become apparent to those skilled in the art upon review of the disclosure. The scope of the invention may, therefore, be determined not with reference to the above description, but instead may be determined with reference to the pending claims along with their full scope or equivalents.

It may be understood that the present invention as described above can be implemented in the form of control logic using computer software in a modular or integrated manner. Based on the disclosure and teachings provided herein, a person of ordinary skill in the art may know and appreciate other ways and/or methods to implement the present invention using hardware and a combination of hardware and software.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

One or more features from any embodiment may be combined with one or more features of any other embodiment without departing from the scope of the invention.

A recitation of "a", "an" or "the" is intended to mean "one or more" unless specifically indicated to the contrary.

What is claimed is:

1. A method for making disbursements to users, the method comprising:
   storing, by a merchant server, pending disbursement information corresponding to a plurality of pending disbursements;
   providing, by the merchant server, one or more merchant web pages to a user device;
   receiving, by the merchant server, disbursement identification information from the user device via the one or more merchant web pages, the disbursement information indicating a disbursement amount for a disbursement from a merchant to a user of the user device;
   identifying, by the merchant server, the disbursement by comparing the disbursement identification information from the user device to the pending disbursement information;
   sending, by the merchant server to a service provider computer, a disbursement request to make the disbursement to the user of the user device, wherein the disbursement request includes the disbursement information; and
   redirecting, by the merchant server, the user device from the one or more merchant web pages to a URL of a first hosted disbursement page that is hosted by the service provider computer, the user device being redirected by the merchant server after the merchant server identifies the disbursement, wherein the service provider computer provides a hosted disbursement page including the disbursement amount to the user device and receives account information from the user device via the first hosted disbursement page such that the account information bypasses the merchant server, and wherein the service provider computer processes the disbursement using the account information to transfer funds corresponding to the disbursement amount from an account associated with the merchant to the user based on the account information.

2. The method of claim 1, wherein distribution options for the disbursement include a payment to:
   an existing account;
   a new account; and
   an electronic wallet account.

3. The method of claim 2, wherein the payment to an existing account includes an original credit transaction (OCT), automated clearinghouse (ACH) payment, or an account funding transaction (AFT).

4. The method of claim 1, wherein the first hosted disbursement page is viewable on the user device, and wherein the first hosted disbursement page includes a summary of the disbursement and a plurality of fields to receive the account information.

5. The method of claim 1, wherein the service provider computer receives standing instructions from the user, the standing instructions identifying an account to which subsequent disbursements are to be made, wherein the method further comprises:
   sending, by the merchant server to the service provider computer, a second disbursement request to make a second disbursement to the user, wherein the service provider computer makes the second disbursement according to the standing instructions and sends a notification to the user indicating that the second disbursement has been made.

6. The method of claim 5, wherein the standing instructions further identify one or more merchants from which disbursement is to be made.

7. The method of claim 1, wherein the disbursement identification information includes one or more of an order number, a purchase date, a delivery address, a claim number, a policy number, and a policy holder name.

8. A method for making disbursements to users, the method comprising:
   storing, by a merchant server, pending disbursement information corresponding to a plurality of pending disbursements;
   sending, by the merchant server to a service provider computer, the pending disbursement information corresponding to the plurality of pending disbursements;
   providing, by the merchant server, one or more merchant web pages to a user device;
   receiving, by the merchant server from the user device via the one or more merchant web pages, a request for a disbursement from a merchant to a user of the user device;
   sending, by the merchant server to the service provider computer, a disbursement request to make the disbursement to the user, wherein the disbursement request includes a merchant identifier that identifies the merchant; and
   redirecting, by the merchant server, the user device from the one or more merchant web pages to a URL of a first hosted disbursement page that is hosted by the service provider computer, wherein the service provider computer determines a first plurality of fields for the first hosted disbursement page based on the merchant identifier and stored merchant configuration data, provides the first hosted disbursement page including the first plurality of fields to the user device in response to receiving a web page request from the user device, receives disbursement identification information corresponding to the disbursement from the user device via the first plurality of fields of the first hosted disbursement page, identifies the disbursement by comparing the disbursement identification information received from the user device via the first plurality of fields of the first hosted disbursement page to the pending disbursement information received from the merchant server, receives account information from the user device via the first hosted disbursement page such that the account information bypasses the merchant server, and processes the disbursement using the account information to transfer funds from an account associated with the merchant to the user based on the account information.

9. The method of claim 8, wherein distribution options for the disbursement include a payment to:
   an existing account;
   a new account; and
   an electronic wallet account.

10. The method of claim 9, wherein the payment to an existing account includes an original credit transaction (OCT), automated clearinghouse (ACH) payment, or an account funding transaction (AFT).

11. The method of claim 8, wherein the user device is provided a second hosted disbursement page that is hosted by the service provider computer, the second hosted disbursement page being viewable on the user device, the second hosted disbursement page including a summary of the disbursement and a plurality of fields to receive the account information.

12. The method of claim 8, wherein the service provider computer receives standing instructions from the user, the standing instructions identifying an account to which subsequent disbursements are to be made, wherein the method further comprises:
   sending, by the merchant server to the service provider computer, a second disbursement request to make a second disbursement to the user, wherein the service provider computer makes the second disbursement according to the standing instructions and sends a notification to the user indicating that the second disbursement has been made.

13. The method of claim 12, wherein the standing instructions further identify one or more merchants from which disbursement is to be made.

14. The method of claim 8, wherein the disbursement identification information includes one or more of an order number, a purchase date, a delivery address, a claim number, a policy number, and a policy holder name.

15. A server, comprising:
   a processor; and
   a memory device including computer instructions that, when executed by the processor, cause the processor to:
   store pending disbursement information corresponding to a plurality of pending disbursements,
   provide one or more merchant web pages to a user device,
   receive disbursement identification information from the user device via the one or more merchant web pages, the pending disbursement information indicating a disbursement amount for a disbursement from a merchant to a user of the user device,
   identify the disbursement by comparing the disbursement identification information from the user device to the pending disbursement information,
   send, to a service provider computer, a disbursement request to make the disbursement to the user of the user device, wherein the disbursement request includes the pending disbursement information, and
   redirect the user device from the one or more merchant web pages to a URL of a first hosted disbursement page that is hosted by the service provider computer, the user device being redirected after the identifying of the disbursement, wherein the service provider computer provides a hosted disbursement page including the disbursement amount to the user device and receives account information from the user device via the first hosted disbursement page such that the account information bypasses the server, and wherein the service provider computer processes the disbursement using the account information to transfer funds corresponding to the disbursement amount from an account associated with the merchant to the user based on the account information.

16. The server of claim 15, wherein distribution options for the disbursement include a payment to:
   an existing account;
   a new account; and
   an electronic wallet account.

17. The server of claim 16, wherein the payment to an existing account includes an original credit transaction (OCT), automated clearinghouse (ACH) payment, or an account funding transaction (AFT).

18. The server of claim 15, wherein the first hosted disbursement page is viewable on the user device, and wherein the first hosted disbursement page includes a summary of the disbursement and a plurality of fields to receive the account information.

19. The server of claim 18, wherein the service provider computer receives standing instructions from the user, the standing instructions identifying an account to which subsequent disbursements are to be made, wherein the standing instructions further identify one or more merchants from which disbursement is to be made, wherein the memory device further includes computer instructions that, when executed by the processor, cause the processor to:

send, to the service provider computer, a second disbursement request to make a second disbursement to the user, wherein the service provider computer makes the second disbursement according to the standing instructions and sends a notification to the user indicating that the second disbursement has been made.

20. The server of claim 15, wherein the disbursement identification information includes one or more of an order number, a purchase date, a delivery address, a claim number, a policy number, and a policy holder name.

\* \* \* \* \*